United States Patent [19]

Gari

[11] Patent Number: 4,905,353
[45] Date of Patent: Mar. 6, 1990

[54] HERMETIC ADJUSTABLE HOSE CLAMP

[76] Inventor: Francisco A. Gari, Rambla Armenia 3869, Montevideo, Uruguay

[21] Appl. No.: 311,169

[22] Filed: Feb. 15, 1989

[51] Int. Cl.$^4$ ............................................. B65D 63/00
[52] U.S. Cl. ......................................... 24/286; 24/279
[58] Field of Search ............. 24/286, 279, 278, 274 R, 24/20 R, 20 S, 20 EE, 20 CW, 20 TT; 285/252, 253

[56] References Cited

U.S. PATENT DOCUMENTS

| | | | |
|---|---|---|---|
| 813,033 | 2/1906 | Bellamy | 24/286 |
| 1,135,059 | 4/1915 | Scott | 24/286 |
| 1,155,646 | 10/1915 | D'Arey | 24/286 |
| 1,641,559 | 9/1927 | Thompson | 24/279 |
| 2,343,484 | 3/1944 | Sprouse | 24/286 |
| 2,363,206 | 11/1944 | Sprouse | 24/286 |
| 2,659,953 | 11/1953 | Woolsey | 24/279 |
| 2,659,954 | 11/1953 | Woolsey | 24/279 |
| 3,151,373 | 10/1964 | Whitcomb | 24/279 |
| 4,563,795 | 1/1986 | Fournier | 24/279 |

Primary Examiner—Victor N. Sakran
Attorney, Agent, or Firm—Helegott & Karas

[57] ABSTRACT

A hermetic adjustable hose clamp to be used on hoses and the like of different diameters, comprises a strap having two parallel loops and two cylinders inserted in the two loops. A clamping tension is applied to the strap surrounding the hoses by an adjustable screw which joins the two cylinders which are supported at both loops of the strap.

7 Claims, 3 Drawing Sheets

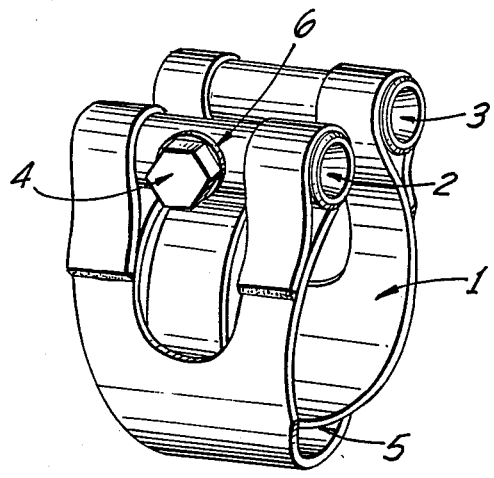
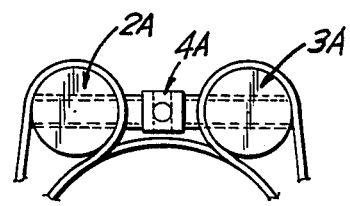
FIG.4  FIG.5A
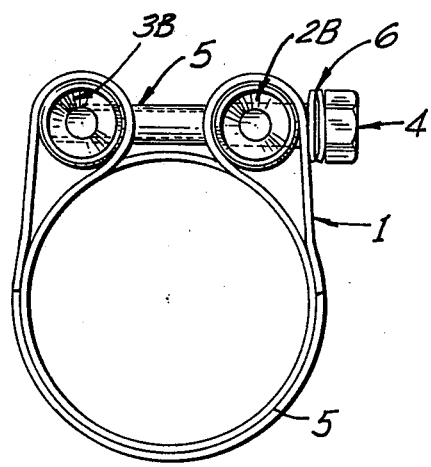
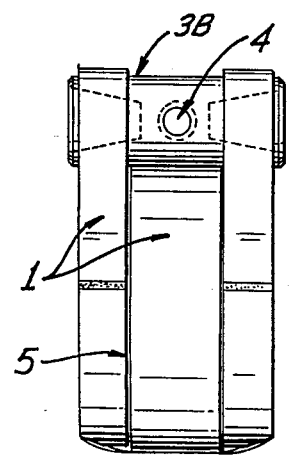
FIG.5  FIG.6

STRAP AS SEEN BEFORE ROLLING, FORMING AND
WELDING THE LOOPS AT BOTH ENDS (REDUCEE SCALE)

HERMETIC ADJUSTABLE HOSE CLAMP

BACKGROUND OF THE INVENTION

1. Field Of The Invention

The present invention relates generally to a hose clamp and, more particularly, to an adjustable hose clamp able to develop a true hermetic seal between a larger flexible cylindrical tube and a smaller less flexible cylindrical tube which has been forced into the larger tube, so as to avoid transfer (in the case of vacuum lines) of pressure from the outside of the tubes to the inside, or (in the case of pressure lines) of pressure from the inside of the tubes to the outside, because of the leaks between the inside surface of the larger tube and the outside surface of the smaller tube.

2. Description Of The Prior Art

Those skilled in the art will immediately recognize that the inwardly acting radial forces created by these pressure bands are micrometrically continuous and do not at any point suffer from the discontinuities that so plague all clamps designed and constructed according to the prior art. These discontinuities allow leakage of the pressurized fluid at one or more places in the joint between the two lines, and this leakage becomes more and more unacceptable as the differential between internal and external pressures increases. This applies not only to lines carrying high internal pressures but also to high vacuum lines.

SUMMARY OF THE INVENTION

Accordingly, it is the principal object of the invention to provide an improved hose clamp which embodies the objective below mentioned.

Objectives of the invention are: to be hermetic, adjustable clamp which is able to stand high pressures.

Another objective is, when necessary, to sustain predetermined high sealing tensions by means of a belleville spring or similar interposed between the head of the adjusting screw and the cylinder close to it.

The hose clamp consists basically of four elements:

1. A strap which surrounds the pipe, tube or hose with two turns, one superimposed on the other. This strap is furnished at each end with two pairs of loops which surround two selfcentering cylinders.

2. A first cylinder which is perforated in its central part with a cylindrical hole which passes diametrically from one side to the other in the middle of its length.

3. Another cylinder which is similar to the first except that the central cylindrical diametral hole is threaded. This threaded hole serves as the nut for element 4.

4. The adjusting screw that tightens the hose clamp.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 4 illustrates a perspective view of the design including the optional belleville spring.

FIG. 5 is a front view of the design with the optional belleville spring and the optional parts 2B and 3B (lightweight design).

FIG. 5A shows a detail from FIG. 5 illustrating another option of parts of the device which allows another kind of adjusting screw, with its left-hand thread on one end, its right-hand thread on the other one and its head in the center.

FIG. 6 is a lateral view of FIG. 5.

DETAILED DESCRIPTION OF THE PREFERRED EMBODIMENT

Figure 1:
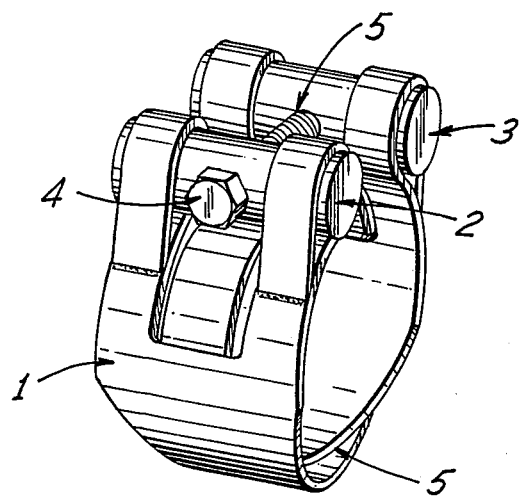
FIG. 1 shows a perspective view illustrating the hermetic adjustable hose clamp.

Referring now to the drawings, like reference numerals designate identical or corresponding parts throughout the several views of the drawings.

Figure 2:
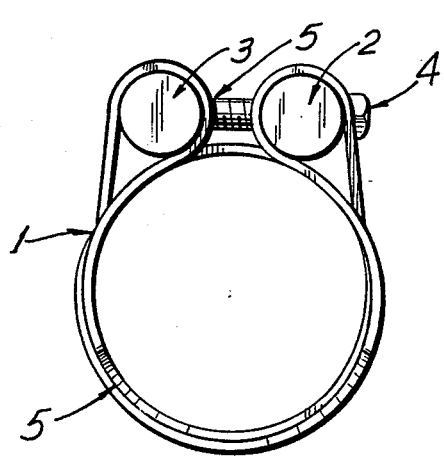
FIG. 2 is a front view of the basic design.
Figure 3:
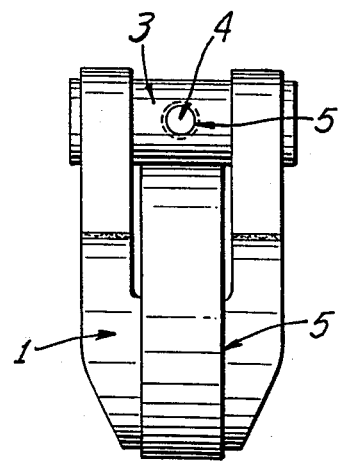
FIG. 3 shows a lateral view of the invention.
Figure 7:
FIG. 7 illustrates Part 1 of the invention before rolling it.

The device consists basically of four parts (as shown in FIGS. 1-3.):

Part 1 is a single strap of engineering material (steel, bronze, brass, aluminum, reinforced plastic, engineering plastic, carbon fiber composite or the like) cut or molded as shown in FIG. 7, and then closed upon itself to form two rings, one superimposed upon the other, as shown in FIG. 2: the inside diameter of the inner ring is chosen to be slightly larger than the outside diameter of the larger of the two tubes to be sealed. Each of the four forked ends of the strap is then formed into a loop whose inside diameter will allow a close sliding fit for parts 2 and 3 of the device of the invention. The loop is then welded or rivetted closed in the case of metal straps. In the case of plastic materials the loops could be formed in the mold or joined (stuck or fixed) with adhesive.

Part 2 is a self-centering solid cylinder of any applicable engineering material (steel, bronze, brass, aluminum, reinforced plastic, engineering plastic, carbon fiber composite or the like) provided with a crosswise hole in the center of the length for the free passage of adjusting screw part 4. The outside diameter of this cylinder is such that the cylinder is a close sliding fit in the corresponding loops in part 1.

Part 3 is a self-centering solid cylinder of any applicable engineering material (steel, bronze, brass, aluminum, reinforced plastic, engineering plastic, or the like) provided with a crosswise threaded hole in the center of its length to act as a nut for the adjusting screw part 4. The outside diameter of this cylinder is a close sliding fit in the corresponding loops in part 1.

Part 4 is a standard screw of any applicable engineering material (steel, bronze, brass, aluminum, reinforced plastic, carbon fiber composite, engineering plastic, or the like) with any suitable head (hexagonal, square, ordinary slotted, Phillips, hollow hexagonal, or the like) provided with a coarse or fine thread to fit the threaded hole in the cylinder Part 3, the thread being sufficiently long to close the opposing loops from the fully-open to the fully-closed position when turned in the closing direction.

Parts 2B 3B (can be): in other cases, the cylinders which both have two tapped holes at both ends, as seen in FIGS. 5 and 6.

Parts 2A 3A (can be): when required, cylinders and which have, one a right-hand thread and the other a left-hand thread; as seen in, FIG. 5A.

Part 4A shown in FIG. 5A can be provided in an embodiment, which is an adjustable screw that would be turned from its central part, which could be hexagonal, square, with through holes for pins, and the like, in order to make the required adjustments.

An optional part 5 may be provided (optional): Sufficient high-grade lubricant 5 is intended to reduce the coefficient of friction between the sliding parts of the device to a value much lower than this coefficient would be without the lubricant. This lubricant is applied to the sliding surfaces of both pressure strap or part 1 and the adjusting screw 4. Suitable lubricants are high-pressure grease, colloidal graphite powder, colloidal lead carbonate in oil or grease, proprietary lubricants such as "Lubrite" and "Molykote", colloidal molybdenum sulphide dry or mixed with oil or grease, silicone grease, and the like.

An optional part may be provided, as shown in FIGS. 4 and 5. A possible accessory to the invention is the use of springs or other artifices to maintain a practically constant radial closing force under small deformations. For example, two belleville spring washers, 6 back to back, could be placed between the cylinder (part 2, FIGS. 4 and 5) and the head of the screw (part 4) using springs capable of generating the required closing force.

Figure 10:
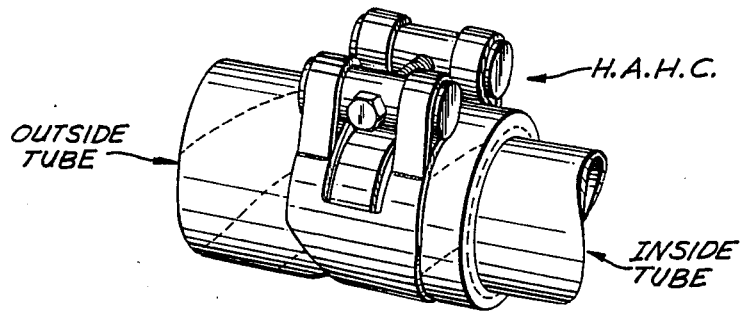
FIG. 10 shows an example of the application of the model.

In a method of using the device after the two tubes to be sealed have been assembled so that the smaller tube is a reasonably close fit in the larger, tube hermetic adjustable hose a clamp whose inside diameter in the open position is slightly larger than the outside diameter of the larger tube is placed over the larger tube as shown in FIG. 10. The adjusting screw is then turned so as to reduce the inside diameter of the hermetic adjustable hose clamp. When this inside diameter becomes less than the outside diameter of the larger tube, the adjusting screw creates a tension throughout the lengths of the superimposed pressure bands of the hermetic adjustable hose clamp. This tension is transmitted almost uniformally throughout the lengths of the pressure bands and results in almost uniform closing of the walls of the larger tube upon the smaller one.

When specific materials are mentioned in this application, it is to be understood that these materials are so mentioned in exemplary form, and that the scope of the patent is to include, but not to be restricted to, these materials.

Some common examples of the use of this device would be as follows
A: Sealing the joint between a flexible hose and an automobile radiator.
B: Sealing the joint between a vacuum-tight rubber hose and the high vacuum intake tube of a high vacuum pump.
C: Sealing the joints between a low-pressure hydraulic pump and its hose connection to a pressure storage tank.
D: Sealing the joints between a transformer tank and its hose connection to an oil expansion tank.
E: Sealing the joint between a flexible hose and its mating part made from a semi-rigid plastic.
F: Plugging a tubular orifice. The hermetic hose clamp provides a fast and simple solution to this very common problem, as follows: A short length of hose whose inside diameter corresponds to the outside diameter of the tubular orifice, and whose bursting strength is great enough to resist the pressures which will be developed in the plugged orifice, is passed over the orifice and secured with the correct size of hermetic adjustable hose clamp. A suitable solid cylindrical body is fitted into the other end of the hose and secured with a second hermetic adjustable hose clamp, this blocking the outlet from the tubular orifice. The solid cylindrical body can be replaced with a pipe of the same size whose end has been closed and welded shut. Those skilled in the art will have no difficulty in devising countless variations on this basic scheme.

It is evident that one of the intents of the method described is to reduce the friction between the sliding parts to as low a value as possible so that the inwardly acting radial forces will be as uniform as possible. To this end the use of engineering plastic materials, some of which have an inherently low coefficient of friction, has been proposed in this application. In special cases the use of a lubricant will not be necessary, and this possibility is hereby specifically included in the foregoing description of the device.

In order to reduce the coefficient of friction in metallic materials, coating of the metal with a lubricant-retaining film of chemically deposited phosphates or other similar films may be advantageous. This possibility is hereby specifically included in the foregoing description.

In the foregoing description, part 2 is described as a "solid cylinder". In certain cases, as in aircraft applications, reduction of weight might be important. In this case, hollow cylinders of light-weight high strength materials such as titanium or carbon-fiber composites might be required; and this possibility is hereby specifically included in the description.

In the foregoing description, Part 3 is described as "solid cylinder" with a "crosswise threaded hole" to "act as a nut". Since reduction of weight might be important, hollow cylinders of light-weight high-strength materials might be required. The thin walls of such hollow cylinders might not be inappropriate for threading, or, in the case of carbon-fiber composites, impossible to thread; in such cases, part 3 would be identical with 2, and an external nut (3C-not illustrated in the drawings) would have to be added to part 3 to take the place of the internal nut previously described. This possibility is hereby specifically included in the foregoing description.

Figure 8:
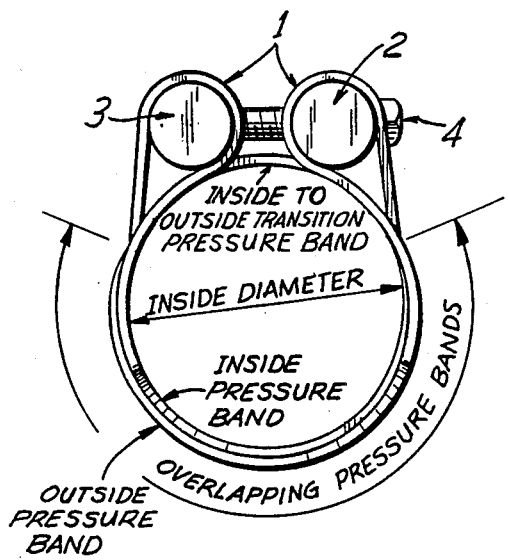
FIG. 8 is the same as FIG. 2 including explanatory notes.

In FIG. 8, an important dimension is marked with its name: "INSIDE DIAMETER". This note is intended to clarify this concept. The inside diameter as drawn is the inside diameter of the innermost of two pressure bands when the adjusting screw is turned to the limit of its opening direction, that is to say, when the inner pressure band is as wide open as the screw will allow.

Figure 9:
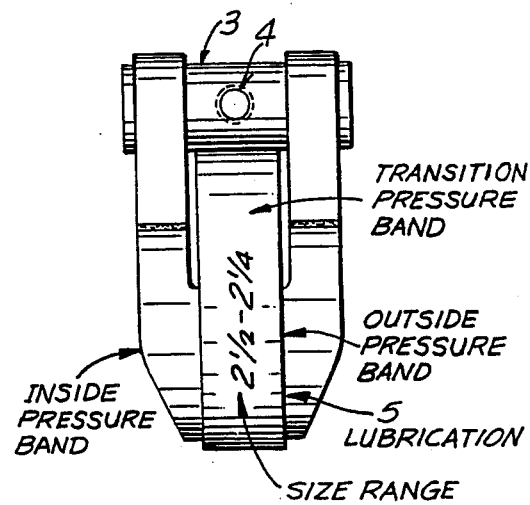
FIG. 9 is like FIG. 3 but with explanatory notes.

In FIG. 9, the outermost pressure band is shown prominently marked (by stamping, etching, engraving, or other permanent means) with two numbers. The larger of these two numbers represents the maximum diameter in inches to which the clamp should be opened; the samller, the minimum to which it should be closed. Evidently, these numbers will change with each change of size of the clamp; also, in countries using the metric system, the numbers will represent diameters in millimeters instead of inches. This size indication is hereby specifically included in the foregoing description.

While specific embodiments of the invention have been illustrated and described herein, it is realized that numerous applications and changes will occur to those skilled in the art. It is therefore to be understood that the appended claims are intended to cover all such modifications and changes as fall within the true spirit and scope of the invention.

I claim:

1. A hermetic adjustable hose clamp for clamping two tubular elements having ends positioned one inside another, the clamp comprising a substantially circular strap including a solid nonperforated central portion and two end portions which are wider than said central portion and each being recessed, said circular strap having two turns and adapted to surround said tubular elements in an inserted position, said turns being formed by said central portion and overlapping one another, said strap further including two loops formed by said end portions and extending outwardly from said turns, each loop having two loop portions formed by a recess of each of said end portions and spaced from each other and aligned with one another; two solid substantially cylindrical members, said two loops being substantial parallel to each other and each receiving one of said substantially cylindrical members, each cylindrical member having a transversal hole in a center thereof; and an adjustable screw extending through each hole for joining said cylindrical members to each other so as to apply radial forces to said turns and to clamp said tubular elements together to thereby prevent any leakage of a medium therefrom.

2. The clamp according to claim 1, wherein one of the holes in said cylindrical members is threaded to form a nut for said screw.

3. The clamp according to claim 1, wherein spring washer means is provided between a head of said screw and one of said cylindrical members.

4. The clamp according to claim 3, wherein said spring washer means includes a Belleville spring.

5. The clamp according to claim 1, wherein said adjustable screw extends centrally between two loop portions of each loop.

6. The clamp according to claim 1, wherein each cylindrical member has an axial truncated conical recess at each end thereof.

7. The clamp according to claim 1, wherein one of said cylindrical members has a right-hand thread in the transversal hole thereof and another of said cylindrical members has a left-hand thread in the transversal hole thereof.

* * * * *